United States Patent [19]
Polanyi et al.

[11] Patent Number: 5,237,458
[45] Date of Patent: Aug. 17, 1993

[54] DEVICE FOR ADJUSTING AUTOMOBILE SIDE VIEW MIRROR

[76] Inventors: Michael L. Polanyi; Thomas G. Polanyi, both of 105 Vaughn Hill Rd., Bolton, Mass. 01740

[21] Appl. No.: 989,770

[22] Filed: Dec. 14, 1992

[51] Int. Cl.$^5$ .............................. G02B 5/08; B60R 1/06
[52] U.S. Cl. ..................................... 359/839; 359/850; 359/865; 359/872; 362/83.1
[58] Field of Search ............... 359/839, 843, 844, 850, 359/855, 865, 866, 871, 872; 362/83.1, 142

[56] References Cited

U.S. PATENT DOCUMENTS 5,022,747  6/1991  Polanyi et al. .................. 359/872
5,122,910  6/1992  Polanyi et al. .................. 359/865

Primary Examiner—Bruce Y. Arnold
Assistant Examiner—R. D. Shafer
Attorney, Agent, or Firm—Michael J. Striker

[57] ABSTRACT

A side view mirror assembly for an automobile comprises a side view mirror having a reflective surface and a transparent portion, a target fixed with respect to the automobile, located behind the side view mirror, and an auxiliary mirror having a reflective surface which is considerably smaller than the reflective surface of the side view mirror attached to the rear of the side view mirror, and so inclined with respect to the side view mirror that it enables a driver of an automobile to see the target in the auxiliary mirror through the transparent portion of the side view mirror, and when the target is seen by the driver in the auxiliary mirror the line of sight of the driver looking in the side view mirror is directed toward a required blind spot area near the automobile.

7 Claims, 2 Drawing Sheets

DEVICE FOR ADJUSTING AUTOMOBILE SIDE VIEW MIRROR

BACKGROUND OF THE INVENTION

The present invention relates to a device for adjusting automobile side view mirrors.

The driver of a motor vehicle needs to monitor the traffic in the rear of his vehicle travelling in his direction. As a rule a vehicle 1' shown in FIG. 1 is provided with two mirrors for this purpose. A rear view mirror 2' is mounted inside the vehicle in front above and slightly to the right of a driver 3'. A side view mirror 4' is mounted outside the vehicle in front and slightly to the left of the driver. The proper adjustment of the rear view mirror to present to the driver a full view of the road and the traffic behind him presents as a rule no problem. However, the view offered by this rear view mirror within the angle $\alpha$ does not include a portion of the left lane and the area to the left and immediately behind the vehicle 1' within an angle $\beta$. This is a well known "blind spot". The importance of being able to visualize a car 5' or an obstacle located in the blind spot is well known.

The proper adjustment or aiming of the side view mirror 4' is as a rule a subjective procedure and presents certain difficulties to some drivers. Some car manufacturers recommend to adjust a side view mirror to the center of an adjacent lane of traffic with a slight overlap of the view obtained in the inside mirror. The procedure which is commonly used for adjusting the side view mirror without an object in the blind spot includes first aiming the side view mirror to visualize the tail end of the car 1 and then tilting the mirror a "little bit" with the hope that it will afford a view of the car 5' or other object located in the blind spot. The problem with this procedure is that as a rule there is no target to aim at.

Another procedure is to adjust the side view mirror while driving. In this case, the driver must wait for a car 5' properly located in the blind spot, aim the side view mirror 4' at the moving car 5', and to exercise judgment, during which procedure his eyes must wonder away from the road in front of him. This is an uncertain and hazardous procedure.

The same is true with respect to a side view mirror which is mounted outside the vehicle in front and slightly to the right of the vehicle.

We recognized these problems and proposed a side view mirror assembly for an automobile, which avoids the above specified difficulties. Some of our proposals are disclosed in U.S. Pat. Nos. 5,022,747 and 5,122,910. Side view mirror assemblies disclosed in these patents include a side view mirror and an auxiliary mirror which is attached to the side view mirror and has a reflective surface considerably smaller than that of the side view mirror and so inclined with respect to the side view mirror that it enables the driver of an automobile to see in the auxiliary mirror a target provided on the automobile. When the target is seen by the driver in the auxiliary mirror the line of sight of the driver looking at the side view mirror is directed toward the required blind spot area near the automobile. The target to be seen by the driver of an automobile is located in the above listed patents on the body of the automobile.

A further modification of the side view mirror assemblies in accordance with our proposals is possible and desirable.

SUMMARY OF THE INVENTION

Accordingly, it is an object of the present invention to provide a device for adjusting an automobile side view mirror, which is a further improvement of the existing devices disclosed in the above listed U.S. Patents.

In keeping with these objects and with others which will become apparent hereinafter, one feature of the present invention resides, briefly stated, in a side view mirror assembly for an automobile which has a side view mirror, having a reflective surface and a transparent portion, a target located behind the side view mirror and fixed with respect to the automobile, and an auxiliary mirror attached to the side view mirror and having a reflective surface considerably smaller than that of the side view mirror and inclined with respect to the side view mirror to enable a driver of an automobile to see the target in the auxiliary mirror through the transparent portion of the side view mirror, so that when the target is seen in the auxiliary mirror the line of sight of the driver looking in the side view mirror is directed toward a required blind spot area near the automobile.

When the target in accordance with the present invention is arranged behind the side view mirror it becomes unnecessary to attach a target on an exposed portion of the automobile.

In accordance with another feature of the present invention, the side view mirror has a mirror element which has a transparent portion and a mounting element fixed with respect to the car, which mounts the mirror element to the car, and the target is provided on the mounting element.

Still another feature of the present invention is that the side view mirror assembly is provided with illuminating means which illuminates the target. The illuminating means can be arranged near the target. On the other hand, the target itself can be formed by the illuminating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
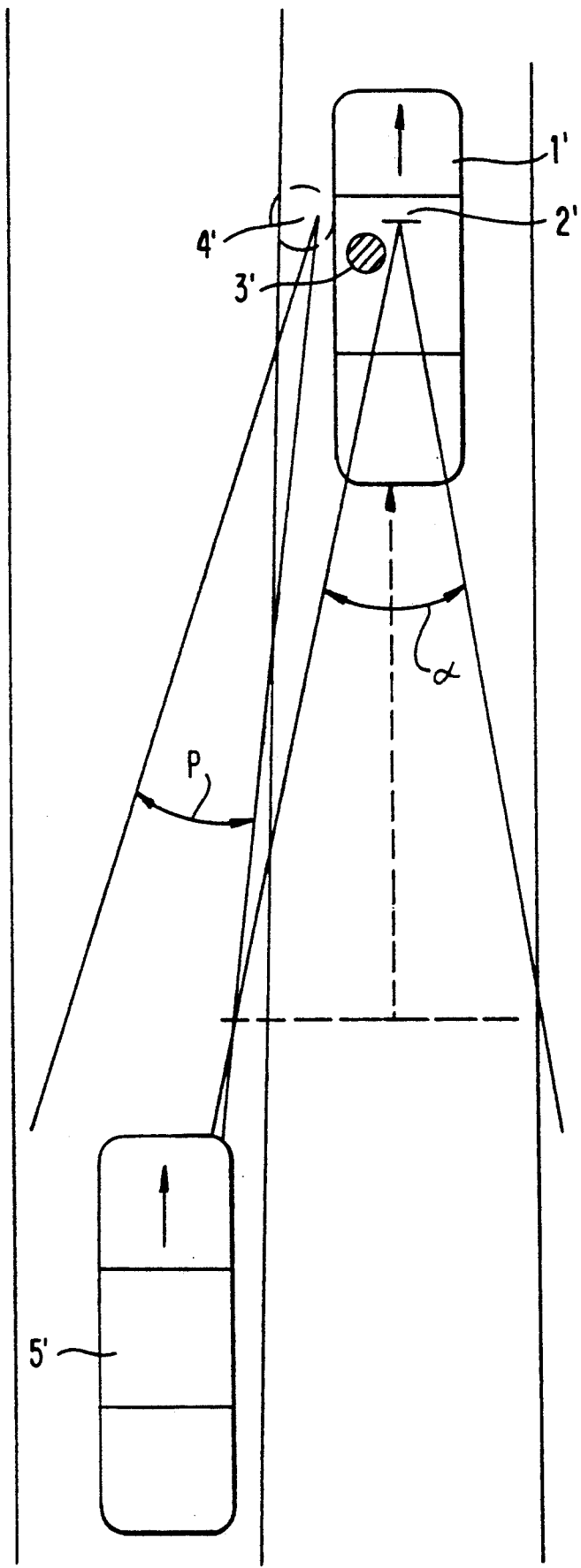
FIG. 1 is a view showing a car provided with a side view mirror in which a driver can see another car on a road.
Figure 2:
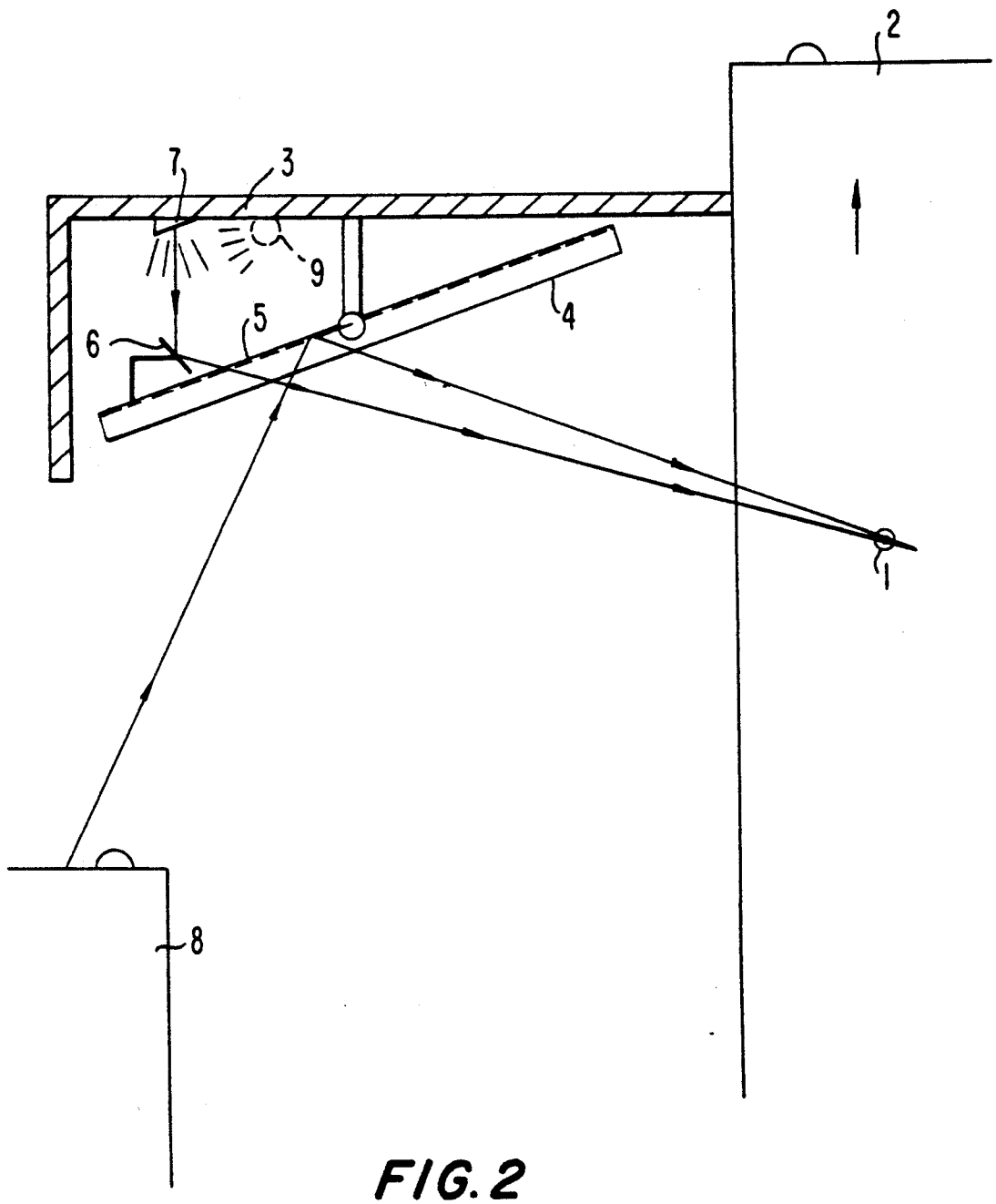
FIG. 2 is a view schematically showing a device for adjusting automobile side view mirror in accordance with the present invention.

As can be seen from FIG. 2 a driver 1 drives a car 2 which is provided with a side view mirror.

The side view mirror has a mounting element or bracket 3 which is fixedly connected with the car 2. It also has a mirror element 4 which is pivotally connected with the mounting element 3. As already disclosed in above mentioned U.S. Pat. Nos. 5,022,747 and 5,122,910, it is required that the side view mirror be adjustable around two essentially perpendicular directions contained in the side view mirror, with respect to a pivot, real or virtual, located close to the center of the side view mirror and that the side view mirror itself be prevented from rotating in its own plane. The mirror element 4 can therefore be adjusted relative to the mounting element 3 to present the driver 1 a full view of the road and the traffic behind him, and also a portion of the left lane and the area to the left immediately behind the vehicle 2.

In accordance with the present invention, the mirror element 4 has a transparent portion 5. An auxiliary mirror 6 is attached to the rear of the mirror element 4 of the side view mirror and in the vicinity of the transparent portion 5 of the latter. The auxiliary mirror 6 has a reflective surface which is considerably smaller than the reflective surface of the mirror element 4 of the side view mirror. The auxiliary mirror 6 is inclined relative to the mirror element 4 of the side view mirror. A target 7 is arranged on the mounting element 3 on a location that enables the driver 1 to see this target after reflection in the auxiliary mirror 6, through the transparent portion 5 of the side view mirror 4. Particularly, the target 7 can be arranged on the mounting element at its side facing the auxiliary mirror 6 and the mirror element 4 of the side view mirror.

The position of the auxiliary mirror 6 and the position of the target 7 are selected so that when the side view mirror is adjusted to a required area, in particular to the blind spot, the driver 1 sees the target 7 through the transparent portion 5 of the mirror element 4 in the auxiliary mirror 6. The positions of the auxiliary mirror 6 and the target 7 must be selected and controlled when the assembly is installed on a car.

If for any reason the driver 1 does not see the target 7 in the auxiliary mirror 6, the driver 1 will adjust the mirror element 4 of the side view mirror by repositioning the mirror element 4 until he will again see the target 7 in the auxiliary mirror 6. Thus, in accordance with the present invention, he no longer needs to point the side view mirror to an adjacent plane or an oncoming car but instead he makes sure that the target 7 is clearly seen in the auxiliary mirror 6, which is achieved in a simple, reliable and safe manner. As disclosed in the Patents referred to above, the correct positioning of the side view mirror valid for driver 1 is also valid for drivers who differ widely in stature and driving position from driver 1.

Reference numeral 8 identifies a car located in the blind spot.

In accordance with one embodiment of the present invention, illuminating means is further provided to illuminate the target, so that it can be seen by a driver when there is insufficient ambient light. The illuminating means 9 can be formed as a light supplied from the electrical system of the automobile.

In accordance with another advantageous feature of the present invention, the target 7 itself is formed as an illuminating means, for example as a light supplied from the board system of the car.

It will be understood that each of the elements described above, or two or more together, may also find a useful application in other types of constructions differing from the types described above. While the invention has been illustrated and described as embodied in a side view mirror assembly, it is not intended to be limited to the details shown, since various modifications and structural changes may be made without departing in any way from the spirit of the present invention. In particular, the fully reflective side view mirror with a transparent portion, may be replaced by an appropriately partially transmissive side view mirror, the side view mirror can have only a small partially transmissive portion.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A side view mirror assembly for an automobile, comprising a side view mirror having a reflective surface and a transparent portion; a target located behind said side view mirror and fixed with respect to the automobile; and an auxiliary mirror attached to the rear of the side view mirror having a reflective surface which is considerably smaller than the reflective surface of said side view mirror and so inclined with respect to said side view mirror that it enables a driver of an automobile to see said target in said auxiliary mirror through said transparent portion of said side view mirror, and when said target is seen by the driver in said auxiliary mirror the line of sight of said driver looking in said side view mirror is directed toward a required blind spot area near the automobile.

2. A side view mirror assembly as defined in claim 1, wherein said side view mirror has a mirror element provided with said reflective surface and said transparent portion, and a mounting element fixedly connected to a car and pivotally supporting said mirror element, said target being mounted on said mounting element.

3. A side view mirror assembly as defined in claim 1; and further comprising illuminating means arranged so as to illuminate said target.

4. A side view mirror assembly as defined in claim 1, wherein said target is formed as illuminating means.

5. A side view mirror assembly as defined in claim 1, wherein said side view mirror has a mirror element provided with said reflective surface and said transparent portion and also having a rear surface, and a mounting element which is immovably fixed to a car and pivotally supports said mirror element, said target being mounted on said mounting element while said auxiliary mirror being mounted on said mirror element.

6. A side view mirror assembly as defined in claim 5, wherein said mirror element and said mounting element have surfaces facing toward one another, said target being mounted on said surface of said mounting element while said auxiliary mirror being mounted on said surface of said mirror element.

7. A side view mirror assembly for an automobile comprising a partially transmissive side view mirror; a target located behind said side view mirror and fixed with respect to the automobile; and an auxiliary mirror attached to to the rear of the side view mirror having a reflective surface which is considerably smaller that the reflective surface of said side view mirror and so inclined with respect to said side view mirror that it enables a driver of an automobile to see said target in said auxiliary mirror through said partially transmissive side view mirror, and when said target is seen by the driver in said auxiliary mirror the line of sight of said driver looking in said side view mirror is directed toward a required blind spot area near the automobile.

* * * * *